United States Patent
Lu et al.

(10) Patent No.: US 11,885,071 B2
(45) Date of Patent: Jan. 30, 2024

(54) ARAMID-MICA COMPOSITE INSULATING NANOPAPER AND PREPARATION METHOD THEREOF

(71) Applicant: Shaanxi University of Science & Technology, Xi'an (CN)

(72) Inventors: Zhaoqing Lu, Xi'an (CN); Fengfeng Jia, Xi'an (CN); Songfeng E, Xi'an (CN); Li Hua, Xi'an (CN)

(73) Assignee: Shaanxi University of Science & Technology, Xi'an (CN)

( * ) Notice: Subject to any disclaimer, the term of this patent is extended or adjusted under 35 U.S.C. 154(b) by 153 days.

(21) Appl. No.: 17/357,457

(22) Filed: Jun. 24, 2021

(65) Prior Publication Data
US 2022/0316141 A1 Oct. 6, 2022

(30) Foreign Application Priority Data
Apr. 1, 2021 (CN) .......................... 202110353768.7

(51) Int. Cl.
| | |
|---|---|
| D21H 23/04 | (2006.01) |
| D21H 13/26 | (2006.01) |
| D21H 17/68 | (2006.01) |
| D21H 27/00 | (2006.01) |
| H01B 3/52 | (2006.01) |
| B82Y 30/00 | (2011.01) |
| B82Y 40/00 | (2011.01) |

(52) U.S. Cl.
CPC ............. D21H 23/04 (2013.01); D21H 13/26 (2013.01); D21H 17/68 (2013.01); D21H 27/00 (2013.01); H01B 3/52 (2013.01); B82Y 30/00 (2013.01); B82Y 40/00 (2013.01)

(58) Field of Classification Search
CPC ........ D21H 23/04; D21H 13/26; D21H 17/68; D21H 27/00; H01B 3/52; B82Y 30/00; B82Y 40/00
See application file for complete search history.

(56) References Cited

U.S. PATENT DOCUMENTS

2021/0062429 A1 * 3/2021 Wang ....................... H01B 3/52

FOREIGN PATENT DOCUMENTS

| CN | 110205862 A | * | 9/2019 | ............. D21H 13/26 |
| CN | 111809440 A | * | 10/2020 | |

* cited by examiner

*Primary Examiner* — Anthony Calandra
*Assistant Examiner* — Stephen M Russell

(57) ABSTRACT

An aramid-mica composite insulating nanopaper and a preparation method thereof are disclosed. A mixture of mica and urea is subjected to a solid-phase ball milling, to obtain nano mica modified with amino groups on the surface, which is then assembled with the aramid nanofiber by stepwise suction filtration according to the present disclosure, to form an ordered nanopaper, thereby obtaining an aramid-mica composite insulating nanopaper with ultra-high insulation performances.

9 Claims, No Drawings

ARAMID-MICA COMPOSITE INSULATING NANOPAPER AND PREPARATION METHOD THEREOF

CROSS REFERENCE TO RELATED APPLICATION

This application claims the priority of Chinese Patent Application No. 202110353768.7, entitled "Aramid-mica Composite Insulating Nanopaper and Preparation Method Thereof" filed on Apr. 1, 2021, which is incorporated herein by reference in its entirety.

TECHNICAL FIELD

The present disclosure relates to the crossing technical field of papermaking industry and insulation industry, and in particular, to an aramid-mica composite insulating nanopaper and a preparation method thereof.

BACKGROUND

In recent years, with the rapid development of the economy and the increasing progress of science and technology, the high-speed railway, as an important means of transportation, has gradually become as popular as busses, and the traction motors of the high-speed railway have placed higher requirements on the performance of insulating materials. Traditional insulating materials have been unable to meet the requirements in terms of humidity resistance, temperature resistance, chemical stability and insulation performance. Aramid fiber has attracted much attention for its excellent high temperature resistance and chemical stability. The aramid-mica composite paper prepared by introducing mica into aramid fiber has been widely studied for its excellent insulation performances. However, there is a need for improvement of the mechanical properties and insulation performances of the aramid-mica composite paper prepared by the existing methods.

SUMMARY OF THE INVENTION

An objective of the present disclosure is to provide an aramid-mica composite insulating nanopaper and a preparation method thereof. The aramid-mica composite insulating nanopaper according to the present disclosure exhibits more excellent mechanical properties and insulation performances.

In order to achieve the above-mentioned objective, the present disclosure provides the following technical solutions:

The present disclosure provides a method for preparing an aramid-mica composite insulating nanopaper, comprising ball milling and mixing mica and urea to obtain a ball-milled material; washing the ball-milled material to remove free urea from the ball-milled material to obtain a washed solid; dispersing the washed solid in water to obtain a mica nanosheet dispersion; subjecting an aramid nanofiber dispersion to a first vacuum filtration to obtain a solid; adding the mica nanosheet dispersion to the solid to obtain a mixture; subjecting the mixture to a second vacuum filtration to obtain a mixed solid; repeating in sequence the first vacuum filtration and the second vacuum filtration on the mixed solid for 2 to 100 times to obtain a final mixed solid; and drying the final mixed solid, to obtain the aramid-mica composite insulating nanopaper.

In some embodiments, a mass ratio of mica to urea is in a range of 1:(1-60), and the ball milling is performed for 6 to 100 hours, with a rotation speed of 100-600 rpm.

In some embodiments, the concentration of the mica nanosheet dispersion is in a range of 0.2-1 mg/mL.

In some embodiments, the aramid nanofiber dispersion is prepared by a method comprising mixing an aramid nanofiber-dimethyl sulfoxide dispersion with water, and homogenizing to obtain the aramid nanofiber dispersion.

In some embodiments, the concentration of the aramid nanofiber-dimethyl sulfoxide dispersion is 2 mg/mL, and a volume ratio of the aramid nanofiber-dimethyl sulfoxide dispersion to water is in a range of 1:(1-10).

In some embodiments, the homogenizing is performed for 1-10 minutes.

In some embodiments, the concentration of the aramid nanofiber dispersion is in a range of 0.2-1 mg/mL.

In some embodiments, a volume ratio of the aramid nanofiber dispersion to the mica nanosheet dispersion is in a range of (0-10):(0-10), with the proviso that the volumes of the aramid nanofiber dispersion and the mica nanosheet dispersion are not zero.

The present disclosure provides the aramid-mica composite insulating nanopaper as prepared by the method described in the above technical solutions.

The present disclosure provides a method for preparing an aramid-mica composite insulating nanopaper, comprising ball milling and mixing mica and urea to obtain a ball-milled material; washing the ball-milled material to remove free urea from the ball-milled material to obtain a washed solid; dispersing the washed solid in water, to obtain a mica nanosheet dispersion; subjecting an aramid nanofiber dispersion to a first vacuum filtration to obtain a solid; adding the mica nanosheet dispersion to the solid to obtain a mixture; subjecting the mixture to a second vacuum filtration to obtain a mixed solid; repeating in sequence the first vacuum filtration and the second vacuum filtration on the mixed solid for 2 to 100 times to obtain a final mixed solid; and drying the final mixed solid to obtain the aramid-mica composite insulating nanopaper.

In the present disclosure, the mixture of mica and urea is subjected to a solid-phase ball milling so that nano mica modified with amino groups on the surface is obtained, and then the modified nano mica is assembled with aramid nanofiber by a stepwise suction filtration to form an ordered nanopaper, thereby obtaining an aramid-mica composite insulating nanopaper with ultra-high insulation performances. Results of the examples show that compared with the nanopaper obtained by a direct suction filtration, the aramid-mica composite insulating nanopaper according to the present disclosure has larger mechanical strength and better insulation performances (particularly dielectric breakdown strength. Compared with the traditional suction filtration, the present disclosure adopts multiple step-by-step suction filtration to construct an ordered structure in the aramid-mica composite insulating nanopaper, which enables a dense insulating layer inside the insulating paper, and thereby greatly improved insulation performances.

DETAILED DESCRIPTION OF THE EMBODIMENTS

The present disclosure provides a method for preparing an aramid-mica composite insulating nanopaper, comprising ball milling and mixing mica and urea to obtain a ball-milled material; washing the ball-milled material to remove free urea from the ball-milled material to obtain a washed solid;

dispersing the washed solid in water to obtain a mica nanosheet dispersion; subjecting an aramid nanofiber dispersion to a first vacuum filtration to obtain a solid; adding the mica nanosheet dispersion to the solid to obtain a mixture; subjecting the mixture to a second vacuum filtration to obtain a mixed solid; repeating in sequence the first vacuum filtration and the second vacuum filtration on the mixed solid for 2 to 100 times to obtain a final mixed solid; and drying the final mixed solid, to obtain the aramid-mica composite insulating nanopaper.

In the present disclosure, unless otherwise specified, the raw materials required for the preparation are all commercially available products well known to those skilled in the art.

In the present disclosure, mica and urea are ball-milled and mixed, and the obtained ball-milled material is washed to remove free urea from the ball-milled material, to obtain a washed solid, and the washed solid is dispersed in water, to obtain a mica nanosheet dispersion. There is no particular limitation to the specific specifications of mica, and any commercially available mica well known in the art could be used. In some embodiments of the present disclosure, a mass ratio of mica to urea is in a range of 1:(1-60), more preferably 1:(5-50), and further more preferably 1:(15-35). In the present disclosure, mica is modified with urea to generate amino groups on the surface thereof, and the modified mica interacts with the aramid nanofiber to improve the interface bonding force.

In some embodiments of the present disclosure, the ball milling and mixing is performed in a planetary ball mill. There is no particular limitation to the specific model of the planetary ball mill, and any planetary ball mill well known in the art could be used. In some embodiments of the present disclosure, the ball milling is performed for 6 to 100 hours, preferably 20-80 hours, and more preferably 40-60 hours; in some embodiments of the present disclosure, the ball milling is performed with a rotation speed of 100-600 rpm, preferably 200-500 rpm. In some embodiments of the present disclosure, the ball milling is performed with agate ball milling beads as ball milling beads. In some embodiments of the present disclosure, a mass ratio of the ball milling beads to the sum of mica and urea is in a range of (10-100):1, preferably (30-80):1, and more preferably (50-60):1.

After the ball milling and mixing, the obtained ball-milled material is washed to remove free urea from the ball-milled material, to obtain a washed solid, and the washed solid is dispersed in water. In the present disclosure, there is no particular limitation to the means used for washing the ball-milled material, and any means well known in the art could be used as long as free urea could be removed from the ball-milled material. In some embodiments of the present disclosure, washing the ball-milled material is performed by means of a suction filtration or a centrifugation. In the present disclosure, there is no particular limitation to the detergent used for washing the ball-milled material, and any detergent well known in the art could be used as long as the detergent could dissolve urea but not mica. In some embodiments of the present disclosure, the detergent used for washing the ball-milled material is deionized water. In the present disclosure, there is no particular limitation to the dispersion process, and any process well known in the art could be used as long as a mica nanosheet dispersion with a required concentration could be obtained. In the present disclosure, the unreacted urea on the surface of mica could be removed by the suction filtration and washing, and then the obtained modified mica nanosheets are dispersed in water, to obtain a mica nanosheet dispersion.

In some embodiments of the present disclosure, the concentration of the mica nanosheet dispersion is in a range of 0.2 to 1 mg/mL, preferably 0.3 to 0.8 mg/mL, and more preferably 0.5 to 0.6 mg/mL. In the present disclosure, the concentration of the mica nanosheet dispersion specifically refers to the concentration of the mica nanosheet modified with urea.

In the present disclosure, after the mica nanosheet dispersion is obtained, the aramid nanofiber dispersion is subjected to a first vacuum filtration to obtain a solid, and the mica nanosheet dispersion is added to the obtained solid to obtain a mixture, and the mixture is subjected to a second vacuum filtration, to obtain a mixed solid, and the first vacuum filtration and the second vacuum filtration are repeated in sequence on the mixed solid for 2 to 100 times, to obtain a final mixed solid, and the final mixed solid is dried, to obtain an aramid-mica composite insulating nanopaper.

In some embodiments of the present disclosure, the aramid nanofiber dispersion is prepared by a method comprising steps of mixing an aramid nanofiber-dimethyl sulfoxide dispersion with water, and homogenizing, to obtain the aramid nanofiber dispersion. In the present disclosure, there is no particular limitation to the preparation process of the aramid nanofiber-dimethyl sulfoxide dispersion, and any process well known in the art could be used as long as the aramid nanofiber-dimethyl sulfoxide dispersion could be obtained. In some embodiments of the present disclosure, the aramid nanofiber-dimethyl sulfoxide dispersion is prepared as follows: mixing an aramid nanofiber with KOH and dimethyl sulfoxide, and stirring them for 7 days, to obtain an aramid nanofiber-dimethyl sulfoxide dispersion. In some embodiments of the present disclosure, the dosage ratio of the aramid fiber, KOH and dimethyl sulfoxide is specifically 1 g:1.5 g:500 mL. In the present disclosure, there is no particular limitation to the specific specifications of aramid fibers, and any commercially available aramid fiber well known in the art could be used. In the present disclosure, KOH is used as a deprotonation reagent to remove protons on the surface of aramid fibers. In the present disclosure, there is no particular limitation to the process of mixing aramid fibers with KOH and dimethyl sulfoxide and the process of stirring, and any process well known in the art could be used.

In some embodiments of the present disclosure, the concentration of the aramid nanofiber-dimethyl sulfoxide dispersion (i.e. the concentration of the aramid nanofiber in the aramid nanofiber-dimethyl sulfoxide dispersion) is 2 mg/mL; in some embodiments of the present disclosure, a volume ratio of the aramid fiber-dimethyl sulfoxide dispersion to water is in a range of 1:(1-10), preferably 1:(3-8), and more preferably 1:(5-6).

In some embodiments of the present disclosure, the homogenizing is performed in a homogenizer. In the present disclosure, there is no particular limitation to the specific model of the homogenizer, and any homogenizer well known in the art could be used. In some embodiments of the present disclosure, the homogenizing is performed with a rotation speed of 8000 rpm; in some embodiments of the present disclosure, the homogenizing is performed for 1-10 minutes, preferably 3-8 minutes, and more preferably 5-6 minutes. In the present disclosure, the homogenizing is to thoroughly mix the aramid nanofiber-dimethyl sulfoxide dispersion with water, to obtain a uniform aramid nanofiber dispersion.

In some embodiments of the present disclosure, the concentration of the aramid nanofiber dispersion is in a range of 0.2 to 1 mg/mL, preferably 0.3 to 0.8 mg/mL, and more preferably 0.5 to 0.6 mg/mL In the present disclosure, the concentration of the aramid nanofiber dispersion refers to the concentration of aramid nanofibers in the dimethyl sulfoxide-water mixed solvent.

According to the present disclosure, after obtaining the aramid nanofiber dispersion, the aramid nanofiber dispersion is subjected to a first vacuum filtration, to obtain a solid, and the mica nanosheet dispersion is added to the obtained solid, to obtain a mixture, and the mixture is subjected to a second vacuum filtration, to obtain a mixed solid. In the present disclosure, there is no particular limitation to the process of adding a mica nanosheet dispersion to the obtained solid, and any process well known in the art could be used as long as the raw materials could be mixed to be uniform. In some embodiments of the present disclosure, a volume ratio of the aramid nanofiber dispersion to the mica nanosheet dispersion is in a range of (0-10):(0-10), with the proviso that the volumes of the aramid nanofiber dispersion and the mica nanosheet dispersion are not zero; in some embodiments of the present disclosure, a volume ratio of the aramid nanofiber dispersion to the mica nanosheet dispersion is in a range of (3-8):(3-8), preferably (5-6):(5-6). In the present disclosure, there is no particular limitation to the specific processes of the first vacuum filtration and the second vacuum filtration, and any process well known in the art could be used as long as the materials could be suction-dried. In the present disclosure, there is no particular limitation to the devices used for the first vacuum filtration and the second vacuum filtration, and any device for the vacuum filtration well known in the art could be used.

According to the present disclosure, after the second vacuum filtration, the first vacuum filtration and the second vacuum filtration are repeated in sequence for 2-100 times, to obtain a final mixed solid, and the final mixed solid is dried, to obtain the aramid-mica composite insulating nanopaper. In some embodiments of the present disclosure, the drying is performed at a temperature of 105° C.; in some embodiments of the present disclosure, the drying is performed for 5-10 minutes, and preferably 6-8 minutes.

In some embodiments of the present disclosure, the first vacuum filtration and the second vacuum filtration are repeated in sequence for 10 to 80 times, preferably 30 to 60 times, and more preferably 40 to 50 times. In some embodiments of the present disclosure, after the second vacuum filtration, repeating in sequence the first vacuum filtration and the second vacuum filtration for 2 to 100 times is performed as follows: adding an aramid nanofiber dispersion to the mixed solid obtained after the second vacuum filtration to obtain a mixture, subjecting the mixture to a vacuum filtration (i.e., a further first vacuum filtration) to obtain a solid, and adding the mica nanosheet dispersion to the obtained solid, to obtain a mixture, and subjecting the mixture to a vacuum filtration (i.e., a further second vacuum filtration), to obtain a mixed solid, and further adding an aramid nanofiber dispersion to the obtained mixed solid, and in this way, the first vacuum filtration and the second vacuum filtration are repeated in sequence for 2 to 100 times.

In some embodiments of the present disclosure, during repeating in sequence the first vacuum filtration and the second vacuum filtration, the volume of the mica nanosheet dispersion added each time is the same, and the volume of the aramid nanofiber dispersion added each time is the same, and the volume ratio of the mica nanosheet dispersion and the aramid nanofiber dispersion added in each cycle is the same.

In the present disclosure, a mixture of mica and urea is solid-phase ball-milled, to prepare nano mica modified with amino groups on the surface thereof, and then the nano mica is assembled with the aramid nanofiber by a stepwise suction filtration method, to form an ordered nanopaper, thereby obtaining aramid-mica composite insulating nanopaper with ultra-high insulation performances.

The present disclosure provides aramid-mica composite insulating nanopaper prepared by the method described in the above technical solutions. The present disclosure adopts multiple step-by-step suction filtration, to construct an ordered structure in the prepared aramid-mica composite insulating nanopaper, which enables a dense insulating layer inside the material, and greatly improved insulation performances.

The technical solutions of the present disclosure will be clearly and completely described below in conjunction with the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative labor shall fall within the protection scope of the present iii disclosure.

Example 1

1.5 g of KOH and 500 mL of DMSO were added to 1 g of aramid fibers, and they were stirred for 7 days, obtaining a red transparent aramid nanofiber-DMSO dispersion. 2000 mL of deionized water was added to the aramid nanofiber-DMSO dispersion, and the resulting mixture was homogenized for 3 minutes (with a rotating speed of 8000 rpm), obtaining an aramid nanofiber dispersion with a concentration of 0.4 mg/mL.

1 g of mica, 9 g of urea, and 100 g of agate ball milling beads were added to a planetary ball mill, and they were ball-milled with a rotating speed of 500 rpm for 36 hours. The resulting ball-milled material was washed with deionized water, which was performed by means of a suction filtration, to remove free urea from the ball-milled material, finally obtaining a washed solid. The washed solid was dispersed in deionized water, obtaining a mica nanosheet dispersion with a concentration of 0.4 mg/mL.

10 mL of the aramid nanofiber dispersion was subjected to a first vacuum filtration in a vacuum filtration device. After being suction-dried, a solid was obtained. 0.26 mL of the mica nanosheet dispersion was added to the solid, and they were diluted to 10 mL with deionized water, obtaining a mixture. The mixture was subjected to a second vacuum filtration in a vacuum filtration device. After being suction-dried, a mixed solid was obtained. The above-mentioned first vacuum filtration and second vacuum filtration processes were repeated in sequence for 10 times, during which 10 mL of the aramid nanofiber dispersion was added each time, 0.26 mL of the mica nanosheet dispersion was added and then diluted to 10 mL each time, and the resulting mixture was subjected to the second vacuum filtration in the vacuum filtration device. After the repetition, the obtained final solid was dried at 105° C. for 10 minutes, obtaining an aramid-mica composite insulating nanopaper (the content of nano mica in the obtained aramid-mica composite insulating nanopaper was 2.5 wt. %).

Example 2

This example was performed as described in Example 1, except that the volume of the mica nanosheet dispersion was 0.53 mL, and finally, the content of nano mica in the obtained aramid-mica composite insulating nanopaper was 5 wt. %.

Example 3

This example was performed as described in Example 1, except that the volume of the mica nanosheet dispersion is 1.11 mL, and finally, the content of nano mica in the obtained aramid-mica composite insulating nanopaper was 10 wt. %.

Example 4

This example was performed as described in Example 1, except that the volume of the mica nanosheet dispersion is 2.5 mL, and finally, the content of nano mica in the obtained aramid-mica composite insulating nanopaper was 20 wt. %.

Comparative Example 1

This example was performed as described in Example 1, except that no mica was added, that is to say, the content of nano mica in the aramid-mica composite insulating nanopaper was 0 wt %.

Comparative Example 2

The aramid nanofiber dispersion and the mica nanosheet dispersion were prepared according to the procedure as described in Example 1.
100 mL of the aramid nanofiber dispersion and 2.6 mL of the mica nanosheet dispersion were mixed, and they were subjected to a vacuum filtration, obtaining a mixed solid. The mixed solid was dried at 105° C. for 10 minutes, obtaining an aramid-mica composite insulating nanopaper (the content of nano mica in the obtained aramid-mica composite insulating nanopaper was 2.5 wt. %).

Comparative Example 3

This example was performed as described in Comparative Example 2, except that the volume of the mica nanosheet dispersion was 5.3 mL, and finally, the content of nano mica in the obtained aramid-mica composite insulating nanopaper was 5 wt. %.

Comparative Example 4

This example was performed as described in Comparative Example 2, except that the volume of the mica nanosheet dispersion was 11.1 mL, and finally, the content of nano mica in the obtained aramid-mica composite insulating nanopaper was 10 wt. %.

Comparative Example 5

This example was performed as described in Comparative Example 2, except that the volume of the mica nanosheet dispersion was 25 mL, and finally, the content of nano mica in the obtained aramid-mica composite insulating nanopaper was 20 wt. %.

Comparative Example 6

This example was performed as described in Comparative Example 2, except that the amount of mica used was 0 g, that is to say, the content of nano mica in the aramid-mica composite insulating nanopaper was 0 wt %.

Performance Testing

1) The insulating nanopaper obtained in Examples 1 to 4 and Comparative Examples 1 to 6 was subjected to a tensile strength test with a universal material testing machine, and the results were shown in Table 1.

TABLE 1

Tensile strengths of the insulating nanopaper obtained in Examples 1 to 4 and Comparative Examples 1 to 6

| Example No. | Tensile strength (MPa) |
| --- | --- |
| Example 1 | 213.4 ± 7.2 |
| Example 2 | 236.1 ± 12.3 |
| Example 3 | 252.6 ± 6.9 |
| Example 4 | 223.7 ± 5.7 |
| Comparative Example 1 | 166.2 ± 10.2 |
| Comparative Example 1 | 205.8 ± 8.3 |
| Comparative Example 1 | 222.9 ± 12.3 |
| Comparative Example 1 | 154.3 ± 17.1 |
| Comparative Example 1 | 123.2 ± 3.6 |
| Comparative Example 1 | 166.2 ± 10.2 |

As shown in Table 1, by comparing the results of Examples 1 to 4 with those of Comparative Example 1, it can be seen that the present disclosure makes it possible to significantly increase the tensile strength of aramid insulating paper by adding mica; by comparing the results of Examples 1 to 4 with those of Comparative Examples 2 to 5, it can be seen that with the same mica content, the insulating paper prepared by the stepwise suction filtration method according to the present disclosure has larger tensile strength than that prepared by the direct mixing-suction filtration method in the comparative examples.

2) The insulating nanopaper obtained in Examples 1 to 4 and Comparative Examples 1 to 6 was subjected to a dielectric breakdown strength test with a dielectric strength tester, and the results were shown in Table 2.

TABLE 2

Dielectric breakdown strengths of the insulating nanopaper obtained in Examples 1 to 4 and Comparative Examples 1 to 6

| Example No. | dielectric breakdown strength (kV/mm) |
| --- | --- |
| Example 1 | 67.5 |
| Example 2 | 78.6 |
| Example 3 | 83.4 |
| Example 4 | 72.3 |
| Comparative Example 1 | 45.4 |
| Comparative Example 2 | 62.3 |
| Comparative Example 3 | 74.6 |
| Comparative Example 4 | 63.5 |
| Comparative Example 5 | 70.1 |
| Comparative Example 6 | 45.4 |

As seen in Table 2, by comparing the results of Examples 1 to 4 with that of Comparative Example 1, it can be seen that the present disclosure makes it possible to significantly improve the dielectric breakdown strength of the aramid insulating paper; by comparing the results of Examples 1 to 4 and with those of Comparative Example 2 to 5, it can be seen that with the same mica content, the insulating nanopaper prepared by the stepwise suction filtration method according to the present disclosure has larger dielectric breakdown strength than that prepared by the direct mixing-suction filtration method in the comparative examples, indicating that the insulating nanopaper prepared according to the present disclosure has better insulation performances.

The above are only the preferred embodiments of the present disclosure. It should be pointed out that for those of ordinary skill in the art, without departing from the principle of the present disclosure, several improvements and modifications could be made, and these improvements and modifications shall fall within the protection scope of the present disclosure.

What is claimed is:

1. A method for preparing an aramid-mica composite insulating nanopaper, comprising,
   ball milling and mixing mica and urea to obtain a ball-milled material;
   washing the ball-milled material to remove free urea from the ball-milled material to obtain a washed solid;
   dispersing the washed solid in water to obtain a dispersion;
   subjecting an aramid nanofiber dispersion to a first vacuum filtration to obtain a solid;
   adding the dispersion to the solid to obtain a mixture;
   subjecting the mixture to a second vacuum filtration to obtain a mixed solid;
   performing in sequence a third vacuum filtration and a fourth vacuum filtration on the mixed solid to obtain a final mixed solid; and
   drying the final mixed solid to obtain the aramid-mica composite insulating nanopaper.

2. The method as claimed in claim 1, wherein a mass ratio of mica to urea is in a range of 1:(1-60), and the ball milling is performed for 6 to 100 hours, with a rotation speed of 100-600 rpm.

3. The method as claimed in claim 1, wherein the concentration of the mica nanosheet dispersion is in a range of 0.2-1 mg/mL.

4. The method as claimed in claim 1, wherein the aramid nanofiber dispersion is prepared by a method comprising:
   mixing an aramid nanofiber-dimethyl sulfoxide dispersion with water; and
   homogenizing to obtain the aramid nanofiber dispersion.

5. The method as claimed in claim 4, wherein the concentration of the aramid nanofiber-dimethyl sulfoxide dispersion is 2 mg/mL, and a volume ratio of the aramid nanofiber-dimethyl sulfoxide dispersion to water is in a range of 1:(1-10).

6. The method as claimed in claim 4, wherein the homogenizing is performed for 1-10 minutes.

7. The method as claimed in claim 4, wherein the concentration of the aramid nanofiber dispersion is in a range of 0.2-1 mg/mL.

8. The method as claimed in claim 1, wherein the concentration of the aramid nanofiber dispersion is in a range of 0.2-1 mg/mL.

9. The method as claimed in claim 1, wherein a volume ratio of the aramid nanofiber dispersion to the dispersion is in a range of (0-10):(0-10), with the proviso that the volumes of the aramid nanofiber dispersion and the dispersion are not zero.

* * * * *